US 6,535,966 B1

(12) United States Patent
Cherabuddi et al.

(10) Patent No.: US 6,535,966 B1
(45) Date of Patent: Mar. 18, 2003

(54) SYSTEM AND METHOD FOR USING A PAGE TRACKING BUFFER TO REDUCE MAIN MEMORY LATENCY IN A COMPUTER SYSTEM

(75) Inventors: Rajasekhar Cherabuddi, Cupertino, CA (US); Kevin Normoyle, Santa Clara, CA (US); Brian McGee, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/572,646

(22) Filed: May 17, 2000

(51) Int. Cl.$^7$ .......................... G06F 12/00; G06F 13/14
(52) U.S. Cl. .......................... 711/154; 711/108; 711/5; 365/230.03; 365/230.08
(58) Field of Search .................................. 711/3, 5, 150, 711/154, 155, 157, 200, 108; 345/560, 557, 566, 568, 570, 571, 572; 365/49, 230.03, 230.08, 231

(56) References Cited

U.S. PATENT DOCUMENTS

| | | | | |
|---|---|---|---|---|
| 5,390,308 A | * | 2/1995 | Ware et al. | 711/202 |
| 5,537,573 A | | 7/1996 | Ware et al. | 711/137 |
| 5,574,875 A | * | 11/1996 | Stansfield et al. | 711/3 |
| 5,774,409 A | | 6/1998 | Yamazaki et al. | 365/230.03 |
| 5,787,267 A | | 7/1998 | Leung et al. | 711/105 |
| 5,793,663 A | | 8/1998 | Ng et al. | 365/189.05 |
| 6,023,745 A | * | 2/2000 | Lu | 711/149 |
| 6,032,214 A | | 2/2000 | Farmwald et al. | 710/305 |
| 6,125,422 A | * | 9/2000 | May | 711/3 |
| 6,219,764 B1 | * | 4/2001 | Jeddeloh | 711/105 |
| 6,233,661 B1 | * | 5/2001 | Jones et al. | 711/154 |
| 6,269,433 B1 | * | 7/2001 | Jones et al. | 711/105 |
| 6,374,323 B1 | * | 4/2002 | Stracovsky et al. | 365/230.03 |

OTHER PUBLICATIONS

Frederick A. Ware, Direct RDRAM ™ 64/72–Mbit (256k× 16/18×16d), Jan. 12, 1998, pp. 5,24.*
Jim Handy, "The Cache Memory Book 2$^{nd}$ Edition", 1998, pp. 14,15,20,57.*
Rambus Inc. "RMC2 Datasheet" (Aug. 12, 1999, pp. 1–6).
Frederick A. Ware "Direct RDRAM$^{198}$ 64/72–Mbit (256× 16/ 18×16d)—Document DL0035 Version 1.0" (May 1999, pp. 1–62).
Rich Warmke "Designing a Multimedia Subsystem with Rambus DRAMs" (Mar. 1998, pp. 1–9).
Frederick A. Ware, Direct RDRAM ™ 64/72–Mbit (256K× 16/18×16d), Jan. 12, 1998, pp. 1–48.
Rich Warmke, Designing a Multimedia Subsystem with Rambus DRAMs, 5/99, pp. 1–9.
256 Double Data Rate Synchronous DRAM, 1/99, pp. 1–68.

* cited by examiner

Primary Examiner—Matthew Kim
Assistant Examiner—Pierre-Michel Bataille
(74) Attorney, Agent, or Firm—Gunnison, McKay & Hodgson, L.L.P.; Philip J. McKay (57) ABSTRACT

A memory controller for a memory subsystem of a computer system connects to a processor bus. The memory controller is for use with memory devices such as RDRAM or DDR SDRAM that allow for multiple open pages. Memory references are remapped by an address mapper and processed by a page tracking buffer to keep track of open pages in the memory devices. The controller also has a state machine, and an interface to memory devices. The page tracking buffer has a row address content addressable memory for determining when a reference is in an open page, and a bank content addressable memory for determining when a reference is to the same bank as an open page. The controller closes open pages of a bank prior to opening new pages in that bank. The page tracking buffer has fewer lines than the product of the maximum number of memory devices times the maximum number of simultaneously open pages of each device, but provides for tracking any page of any of the memory devices.

8 Claims, 7 Drawing Sheets

SYSTEM AND METHOD FOR USING A
PAGE TRACKING BUFFER TO REDUCE
MAIN MEMORY LATENCY IN A
COMPUTER SYSTEM

FIELD OF THE INVENTION

The invention relates to the field of computer main memory systems. In particular, the invention relates to a page tracking buffer and method for determining when desired data is present at sense structures of a dynamic memory because of prior references to the dynamic memory, and bypassing a row-address phase when desired data is present at those sense structures.

BACKGROUND OF THE INVENTION

All large memory integrated circuits commonly manufactured today have memory cells organized in rows and columns of rectangular arrays. Memory cells of each row are connected to one of many row-select interconnect lines of the array, and memory cells of each column are connected to one of several sets of column sense lines of the rectangular array. While static memory circuits typically have true and complement column sense lines in each set, dynamic memory circuits generally have one column sense line in each set. Typical memory circuits have additional lines interacting with cells of the array, including static memory power and ground lines, or dynamic memory trench capacitor plate lines.

When the array is read, each row-select line is driven by a row decoder. Each row decoder receives a row-select address, and drives one row-select line of one or more of the rectangular arrays to an active value. Memory cells of the row having an active row-select line then couple to their associated column sense lines.

Typical one-transistor dynamic memory integrated circuits, as used in most main memories of computer systems, have many sense amplifiers, generally incorporating one for each column of cells in each rectangular array. Each sense amplifier incorporates circuitry for re-writing the data read from a cell back into the same cell. This is because reading a one-transistor dynamic memory cell to the associated column sense line alters the voltages of that cell enough that the cell data can not be read again unless the cell is re-written. Typically, when an array is read, the sense amplifiers have outputs that feed a column decoder, the column decoder receiving a column address and selecting data from one or more columns to an array output. It is known that the column sense lines of many memory integrated circuits must be precharged before a row address can be decoded, and that precharging sense lines and decoding of a row address take time.

Reading a word of data to the array output leaves data at the unselected sense amplifiers for other data words having the same row select address. Multiple words can then be read by changing column decoder addresses once a row has been read to the sense amplifiers. This is a multicolumn read operation to a page. It is known that column addresses for multicolumn read operations can be incremented through a counter on the dynamic memory integrated circuits, or loaded from an external source without change of the row addresses. Multicolumn write operations are also known. In the art of synchronous dynamic memories, a row that may be accessible in this way is referred to as a page. An open page is one that has been read to the sense amplifiers and is ready for quick access. Typically, a page must be closed, or rewritten from the sense circuits back into the cells, before a different page of the same array can be opened.

Large memory circuits often have more than one rectangular array of cells on them.

It is also known that many computer programs tend to access data near a word that has been recently read, there is therefore advantage in having a computer memory system fetch and cache information near a word that is accessed. In systems having video displays there is also advantage in fetching data from memory for display in lengthy blocks rather than in individual words because of the sequential nature of display operations.

Dual Data Rate Synchronous Dynamic Memory (DDR SDRAM) devices typically have four cell arrays, or banks, per integrated circuit; and support multicolumn read operations to any one page of each bank. Dual-Inline Memory Modules (DIMMs) having DDR SDRAM are known with either one or two sets of DDR SDRAM devices on them, and may therefore have either four or eight banks per DIMM. Computer systems often provide for multiple DIMMs, or pairs of DIMMs when long word lengths are desired, a system having four DDR SDRAM DIMM modules, or pairs of modules, may therefore have from sixteen to thirty-two banks.

Direct RAMBUS memories are also synchronous dynamic memories having provision for multicolumn read operations. In the RAMBUS specification, as viewable at www.rambus.com, multicolumn read operations are used to provide a high-speed burst-mode memory read capability. Further, the 64/72-Mbit Direct RDRAM specification for RAMBUS memory provides for sixteen selectable cell arrays, or banks, per DRAM integrated circuit, each bank having its own row address register, and each bank capable of multicolumn access. The sense amplifiers of 64/72-Mbit Direct RDRAMs are shared between banks in a staggered pattern, such that no bank can be simultaneously open with pages in an adjacent bank, but pages in non-adjacent banks can be open simultaneously. Adjacent banks are therefore conflicting banks.

Future and larger models of Direct RDRAM devices may contain greater numbers of banks, and may provide additional sense amplifiers so that bank conflicts may be eliminated.

The RDRAM specification also suggests use of burst references, where several words are read through a sequence of cycles including:
  PRECHARGE, which closes any open page in the bank,
  SET ROW ADDRESS and ACTIVATE, which open a
    page by reading it to the sense amplifiers,
  READ COLUMN A, reading data at a first column
    address, and
  READ COLUMN B, reading data at a second address.

It is suggested in U.S. Pat. No. 6,032,214, column 10, line 56, through column 11, line 16, that the sense amplifiers of the dynamic memory cell arrays of a memory system having memory devices similar to those of the Direct RDRAM type be used as data storage elements of a cache. Circuitry for controlling such a tertiary cache is not described in U.S. Pat. No. 6,032,214, although the suggestion is made in column 12, lines 12–40 that comparison be performed on the DRAM integrated circuit of the address of a word to be read with the current row address for the associated bank, and a RETRY signal generated by the memory if these do not match. No mention of such a RETRY signal has been found in the 64/72-Mbit Direct RDRAM specification for RAMBUS memory circuits.

A large cache tag memory, having a line for each possible bank of sense amplifiers in a system, could be used to track data cached at the sense amplifiers. This method may, however, require hundreds, or even thousands, of lines as thirty-two Direct RDRAM integrated circuits, having sixteen banks each if the 64/72-Mbit RDRAM is used, are permitted on each RAMBUS memory port, and there may be more than one RAMBUS memory port in a large computing system. Further, such a cache tag memory does not by itself offer a way to track conflicting banks.

SUMMARY OF THE INVENTION

A memory controller for use with DDR SDRAM or Direct RDRAM dynamic memory devices is described. This memory controller supports fast access to data in open pages of the dynamic memory devices through a page-tracking buffer (PTB) that keeps track of multiple open pages in the memory system.

The memory controller maps referenced addresses so that sequentially referenced addresses are not located in adjacent memory banks of Direct RDRAM devices. This is done so that sequential addresses may be located in simultaneously open pages.

The page tracking buffer has a row, or page, address content addressable memory (CAM) to which referenced addresses are presented; a match indicating desired data is in an open page. The page-tracking buffer also has a Bank CAM, and a pair of Conflict CAMs, for identifying other pages of the same bank that may be open or pages open in conflicting banks. These other pages in the same bank or conflicting banks must be closed prior to opening the referenced page. The Conflict CAMs contain the numbers of any potentially conflicting banks, stored through use of a decrementer and an incrementer; thereby resolving bank conflicts.

In an alternative embodiment, the Bank CAM has three match comparison circuits for each bit of storage. In this embodiment, the bank numbers of requested pages are incremented and decremented; and presented to the CAM comparators in unaltered, incremented, and decremented form. Matches found indicate that one or two open pages that must be closed prior to opening the referenced page.

Upon refresh, all open pages are closed.

The page tracking buffer allows tracking of open pages in an expandable memory system without need for providing as many lines of page tracking buffer as the product of the maximum number of memory devices times the maximum number of open pages per memory device of the memory system.

DETAILED DESCRIPTION OF THE PREFERRED EMBODIMENT

In a high performance computer system, there is at least one processor 100 (FIG. 1) with an on-chip first level cache. There is generally a second level cache 102, which may or may not be on the same chip as the processor 100, and there may be a third level cache 104. There may be one or more additional processors 106 with caches. Processors 100 and 106 communicate over a local bus 108 with a main memory controller 110 and through a bus bridge 112 to a system I/O bus 114, which is often of the PCI bus type. Main memory controller 110 and processor 100 may, but need not, be part of the same integrated circuit. Attached to the system I/O bus 114 are one or more peripheral interfaces, such as keyboard, mouse, serial, and printer ports 116, USB ports 118, network interfaces 120, and storage controllers 122, which may in turn connect to a combination of disk, tape, DVD, and CD-writer, and other storage devices 124. Usually there is also a video display controller, which may be connected to the system I/O bus as with video controller 126, may be connected to the processor bus as with video controller 128, or may be directly connected to the main memory controller 110 through an AGP port.

Figure 1:
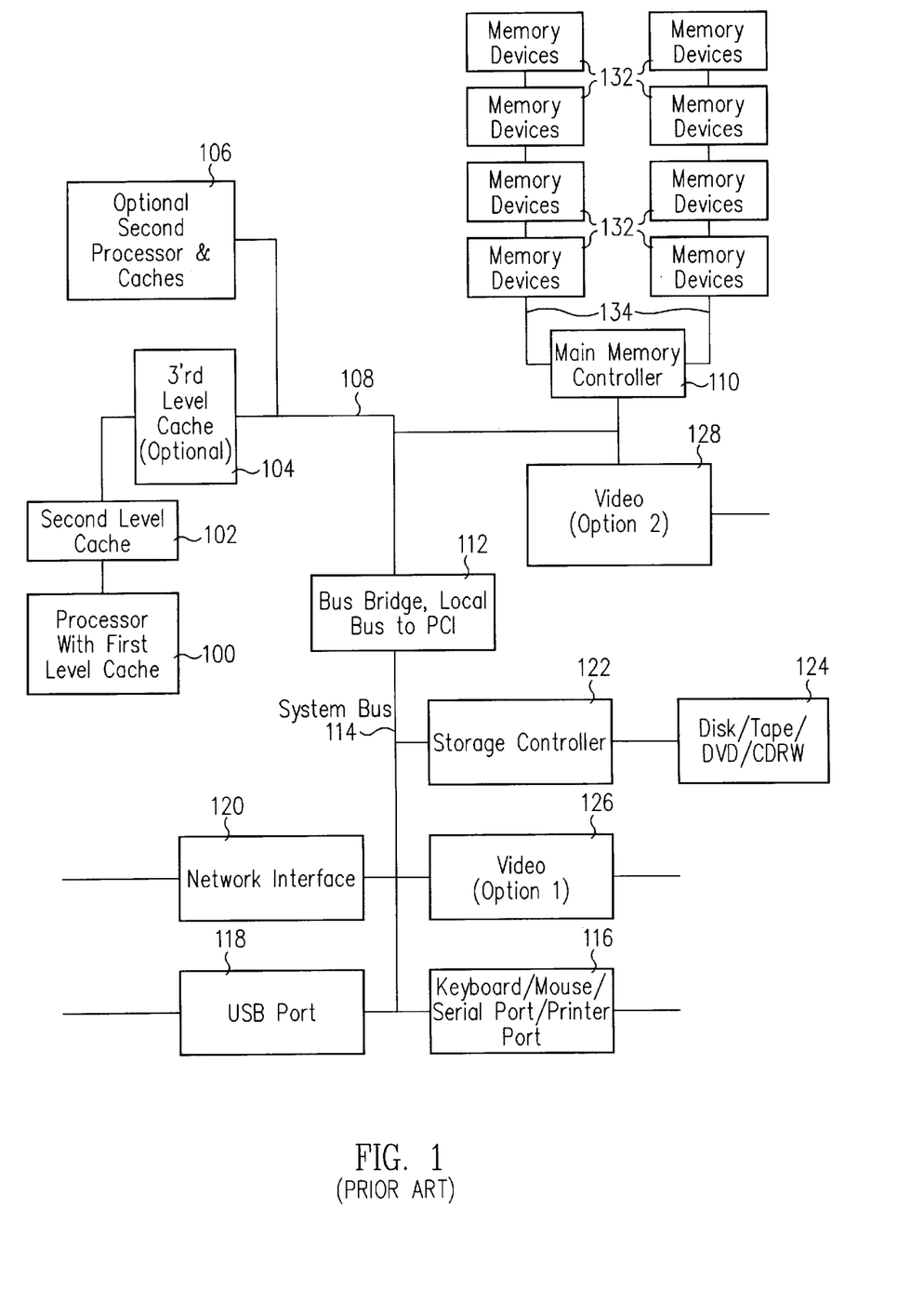
FIG. 1 is a block diagram of a computer system having Direct RDRAM memory, such as may utilize the present invention.

Memory controller 110 communicates with one or more memory devices 132 through one or more memory ports 134. In many modern systems, the memory devices 132 are dynamic memory devices of the DDR SDRAM or of the Direct RAMBUS type.

Figure 2:
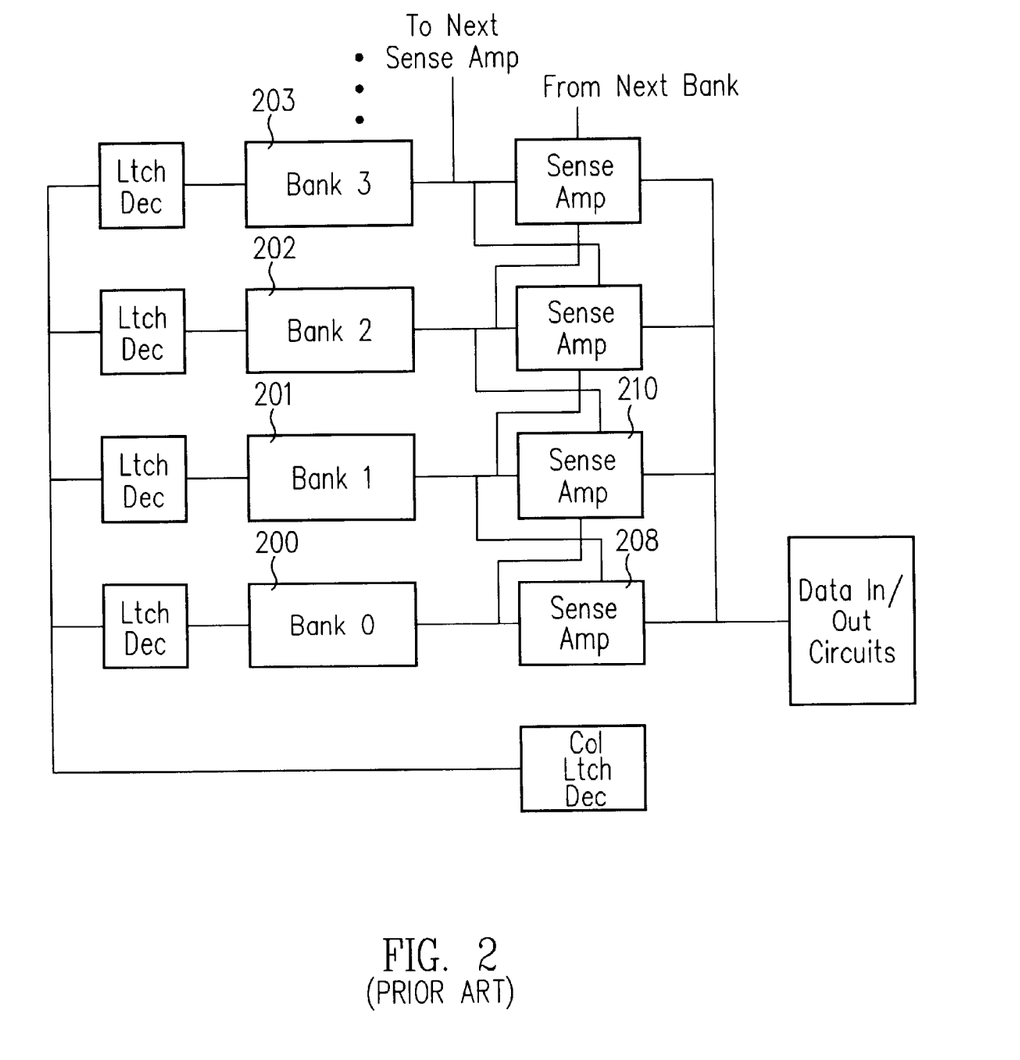
FIG. 2, a block diagram of a portion of a 64/72-Mbit Direct RDRAM, showing the row and column structure and the way sense amplifier structures are shared.

In a 64/72 M-Bit dynamic memory device of the Direct RAMBUS type, there are sixteen memory banks, such as banks 200, 201, 202, and 203 (FIG. 2). Sense amplifiers are shared between banks to conserve area on the integrated circuits; such that the first bank, known as bank zero (200), shares its sense amplifiers 208 with the adjacent bank one (201). This is similar to the way in which bank fifteen, the sixteenth bank (not shown) shares its amplifiers with one adjacent bank. Banks between these share sense amplifiers with the two adjacent banks, for example bank one (201) shares sense amplifiers 210 with banks zero (200) and two (202). This type of memory device can not perform an access to any bank, such as bank one (201) while maintaining an open page, typically of one kilobyte each, in any adjacent bank, such as banks zero (200) and two (202).

It is anticipated that future Direct RAMBUS memory devices may provide for up to thirty-two banks. Further, these devices may provide additional sense amplifiers so that the sharing of sense amplifiers, and the consequential restrictions on access to a bank while open pages are maintained in adjacent banks, may be eliminated.

Figure 3:
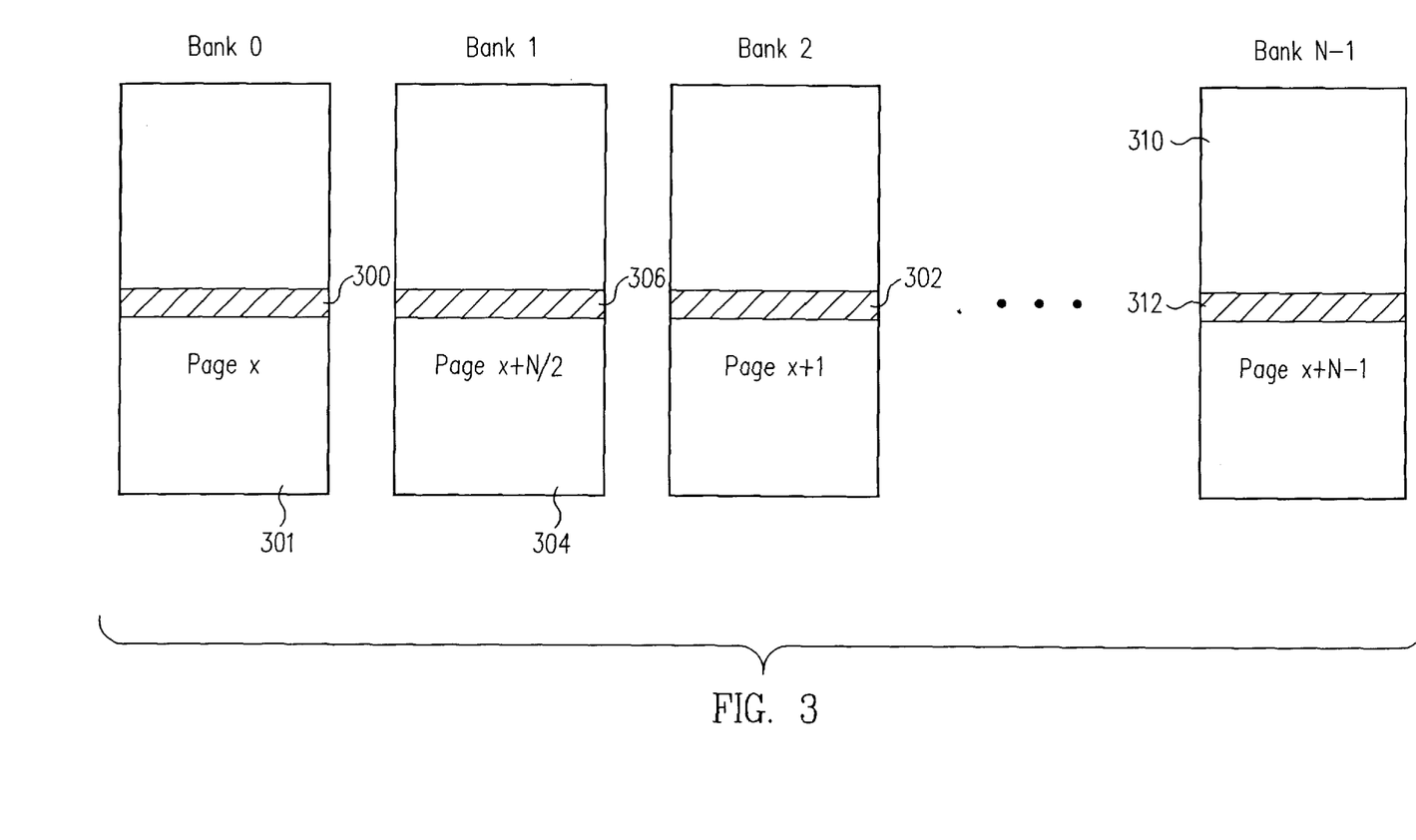
FIG. 3, an illustration of how memory addresses are mapped to minimize page conflicts when sequential addresses are referenced.

With Direct RAMBUS memory devices having shared sense amplifiers, were addresses to be mapped such that adjacent addresses that cross page boundaries be located in adjacent banks, it would not be possible to maintain pages open simultaneously for the adjacent addresses. It has been determined that, by mapping adjacent addresses crossing page boundaries into banks separated by another bank as illustrated in FIG. 3, this can be minimized. If page X (300) is located in bank zero (301), the next higher page X+1 (302) of processor address is located in bank two. This mapping continues to page N−2 (not shown), where N is the number of banks provided, which contains page (N/2)−1 (not shown). Similarly, bank one (304) contains page N/2 (306), bank three (not shown) contains page N/2+1, and so on until bank N−1 (310) contains page X+N−1 (312).

Figure 4:
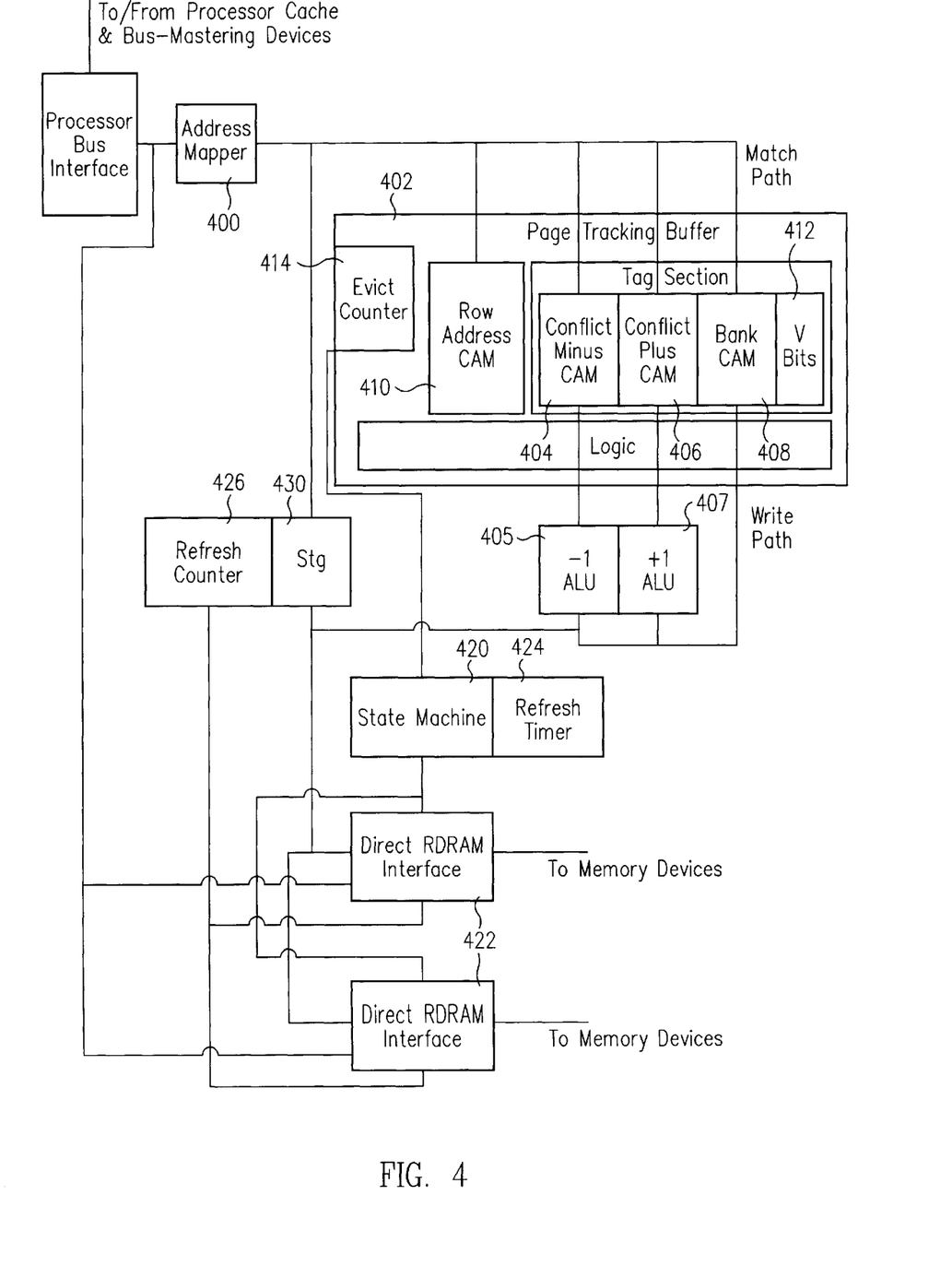
FIG. 4, a block diagram of a memory controller incorporating a Page Tracking Buffer according to the present invention.

When references are made over the local bus to the memory controller 110 of the presently preferred embodiment of the invention, the address is presented to an address mapper 400 (FIG. 4). Address mapper 400 maps the address (step 500 of FIG. 5), by shuffling bits, such that sequential addresses will not cross boundaries between a bank and an adjacent bank with which its sense amplifiers are shared; according to the transformation of FIG. 3. The mapped addresses are presented to a Page Tracking Buffer 402 which determines whether the reference is to a presently open page. The preferred embodiment has thirty-two lines in the Page Tracking Buffer, where each line can hold information about one open page in the memory system.

Each line of the Page Tracking Buffer 402 has a Row Address CAM portion, a Conflict Minus CAM portion, a Conflict Plus CAM portion, and a Bank CAM portion. Whenever a page is opened, or activated, in a bank, the Conflict Minus CAM 404 is loaded with the number of that bank minus one through decrementer 405, and the Conflict Plus CAM 406 is loaded with the number of that bank plus one through incrementer 407. The Conflict Plus and Minus CAMs therefore hold the numbers of the adjacent banks that may share sense amplifiers with the activated bank. Similarly, the bank number is loaded into the Bank CAM 408, and remaining address bits into the Row Address CAM 410.

Figure 5:
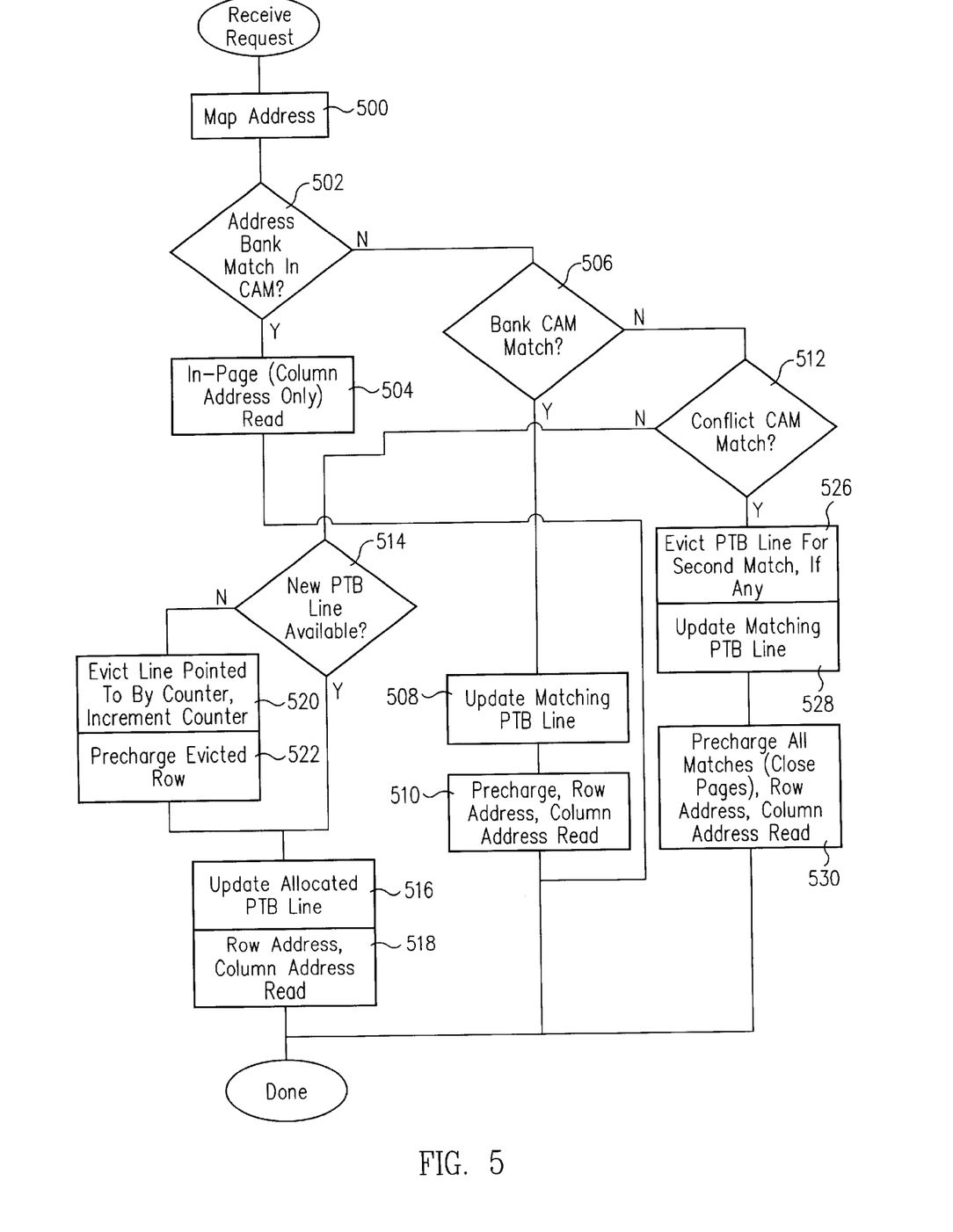
FIG. 5, a flow chart illustrating how a read request is processed by the memory controller.

Those bits of the referenced address that include the row number, bank number, and chip number are presented to the Row Address CAM 410 of the Page Tracking Buffer 402 to test if there is a match 502. If a Row Address CAM 410 match with a valid flag bit 412 is found, along with a match for the same line in the Bank CAM 408, indicating that the page is open with the desired data is already present in the sense amplifiers, no precharge, row select, or activate cycles are needed. The column address is passed 504 to the memory devices 132 and the data is read.

Bits of the address corresponding to the bank number and chip number are also presented to the Bank CAM 408, Conflict Minus CAM 404, and Conflict Plus CAM 406. If the Row Address CAM did not match with a valid flag, but the Bank CAM 408 did match 506, the address information in that Page Tracking Buffer line is replaced 508 with information reflective of the currently desired address. Next, the open page is closed with a Precharge cycle, and the new page is opened with Row Address, Activate, and Read Column Address cycles 510 as required to read the new row to the sense amplifiers.

Those bits of the address corresponding to the bank number and chip number are also presented to the Conflict Minus CAM 404 and the Conflict Plus CAM 406. If neither of these two CAMs find a match 512, then there is no bank having an open page that conflicts with or is the desired bank. A new Page Tracking Buffer line is then allocated if one is available 514, and written 516 with information reflective of the currently desired address, and Row Address, Activate, and Read Column Address cycles are performed 518 to read the new row to the sense amplifiers and to read the desired data.

If no Page Tracking Buffer line is available, the Page Tracking Buffer line indicated by an eviction counter 414 is evicted 520. Evicting a Page Tracking Buffer line requires that the valid bit be marked to indicate that the line is empty, and a Precharge cycle performed 522 to close, or terminate access to, the associated chip and bank, thereby closing any associated open row or page. The eviction counter 414 is incremented to implement a first allocated, first evicted, replacement strategy. The evicted Page Tracking Buffer line is then allocated 516 to the referenced page, it is written with information reflective of the currently desired address, and Row Address, Activate, and Read Column Address cycles are performed 518 by state machine 420 and a RDRAM interface 422 as required to read the new row to the sense amplifiers and to read the desired data. All memory cycles, whether for accessing, opening, closing, or refreshing memory pages, are coordinated by the state machine 420. There may be, and preferably are, multiple RDRAM interfaces 422 because each is limited to communicating with up to thirty-two Direct RDRAM devices and more memory than that may be required in a system.

If either, or both, of the Conflict Minus CAM 404 and the Conflict Plus CAM 406 find a match, the associated Page Tracking Buffer lines are associated with a row, or page, currently open that shares sense hardware with the desired row. These lines must be evicted 526, with a Precharge cycle performed to the associated memory chips to terminate access to the associated chip and bank, closing any associated open row or page. If two lines are evicted, one is marked invalid and the other written 528 with information reflective of the currently desired page. If only one line is evicted, that line is written 528 with information reflective of the currently desired address; if two lines are evicted then one of them is written with information reflective of the currently desired address and the other marked invalid. Row Address, Activate, and Read Column Address cycles are performed 530 as required to read the new row to the sense amplifiers and to read the desired data.

The memory controller also has a refresh timer 424 that tracks when a refresh must be performed. In the preferred embodiment, all refreshes are performed in a block, a refresh counter 426 providing addresses to the RDRAM interfaces 422, and thence to the memory devices. Since there is delay associated with the page tracking buffer 402, a pipeline delay stage 430 provides for delaying information as needed between the address mapper and the memory interfaces 422.

Figure 6:
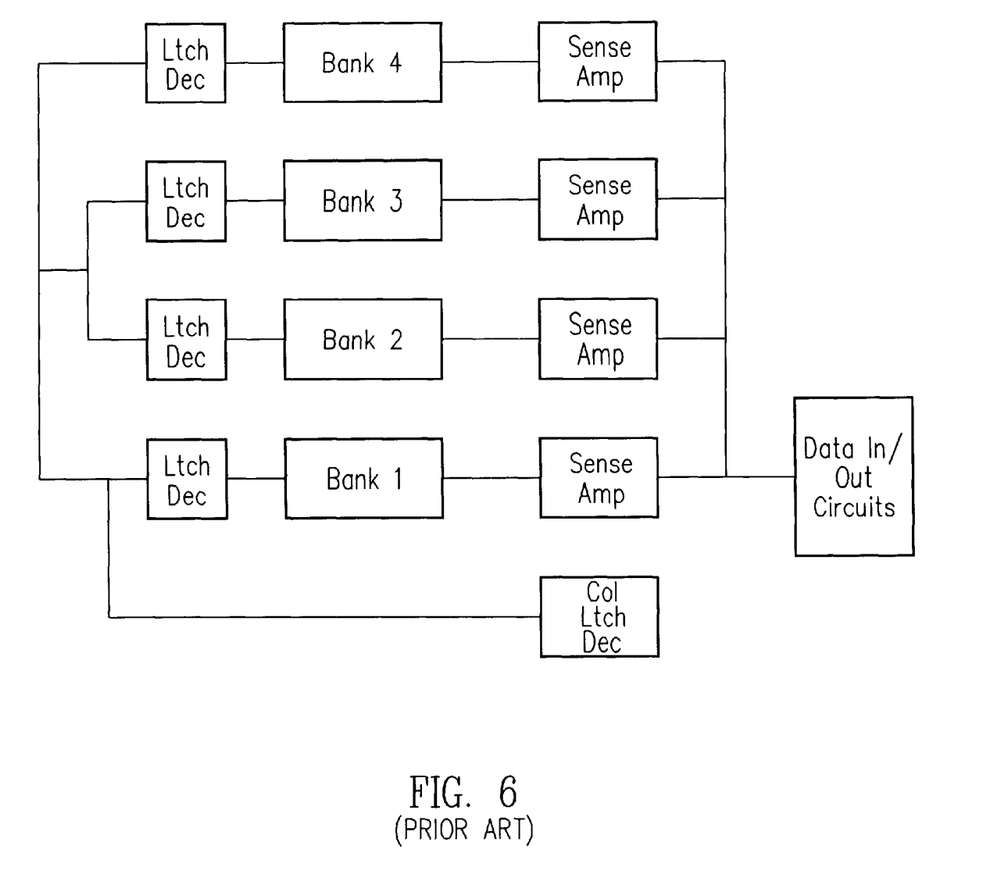
FIG. 6, a block diagram of a portion of a DDR SDRAM.

It is known that future Direct RDRAM chips, and DDR SDRAM chips, do not have shared sense amplifiers, and therefore do not require detection of possibly conflicting banks. These devices have sense amps directly coupled to associated banks as in FIG. 6. When the memory controller of the preferred embodiment is used with such memories, matches in the Conflict CAMs 404 and 406 are ignored. Further, with such memories the address mapper may pass addresses directly, without shuffling bits.

Figure 7:
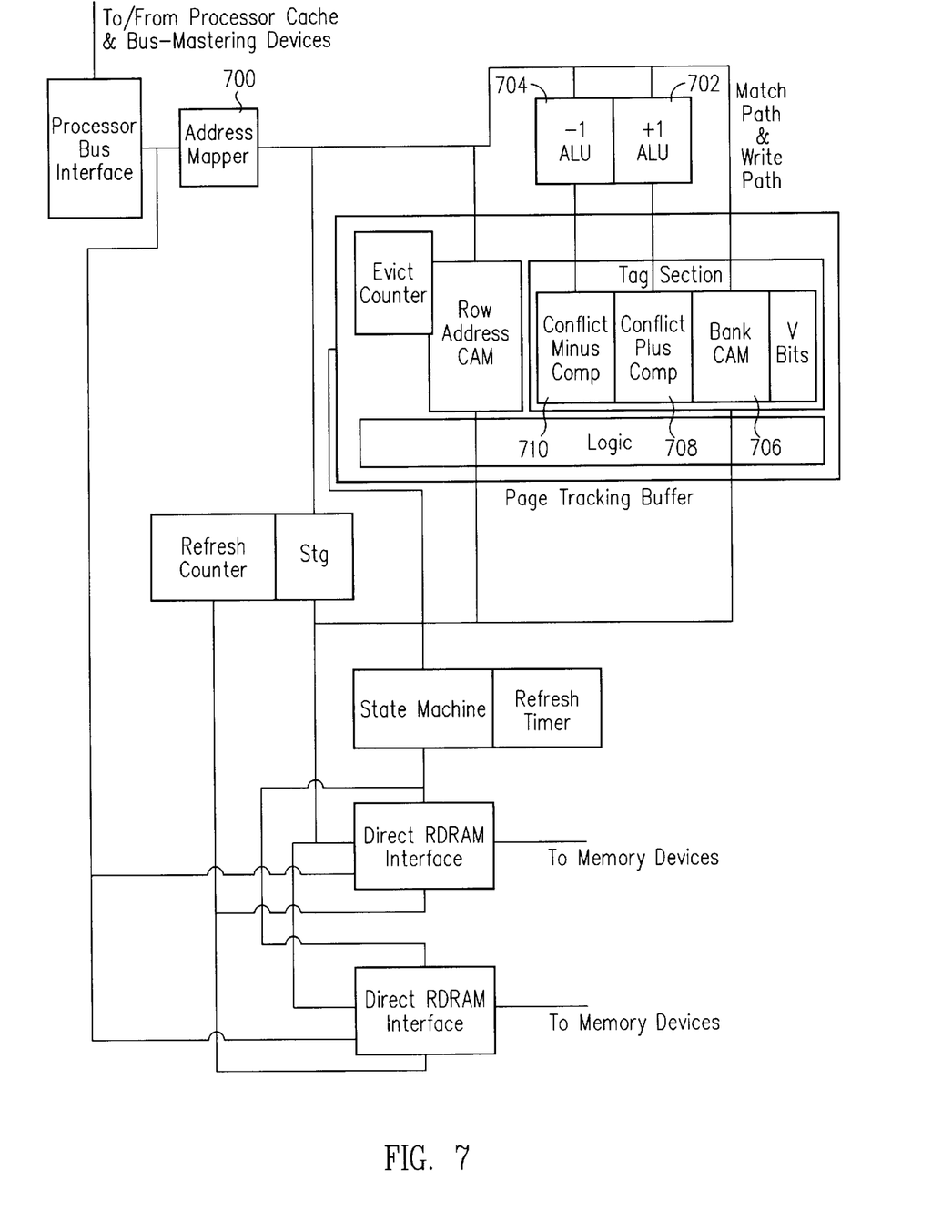
FIG. 7, a block diagram of an alternative embodiment of the invention having incrementers and decrementers in the match path for detecting conflicts.

In an alternative embodiment, the referenced address is passed to an address mapper 700 (FIG. 7), for mapping according to FIG. 3 as in the preferred embodiment of FIG. 5. The mapped address bits corresponding to bank number are passed through an incrementer 702 and a decrementer 704; and to a Bank CAM 706. The Bank CAM has, for each bit, an additional conflict plus comparator 708 and a conflict minus comparator 710. The bank CAM can alternatively be described as a CAM having three match-compare ports and one data port. Processing occurs similarly to the embodiment of FIG. 4 as heretofore described, except that when a Page Tracking Buffer line is written, there is no need to write incremented or decremented bank numbers.

The foregoing discussion focuses on read operations. Write operations occur in a similar manner, as do read-modify-write operations.

While the presently preferred embodiment has thirty-two lines in the page tracking buffer, it is anticipated that other numbers of lines may be provided, such as sixteen or sixty-four; without need for providing as many lines as the product of the maximum number of memory devices times the maximum number of open pages per memory device of the memory system.

While an eviction counter has been described for implementing a least-recently-allocated page-tracking buffer line-replacement scheme, it is anticipated that other replacement schemes may also be implemented.

It is understood that the foregoing discussion may suggest other alternatives, as may be apparent to those skilled in the art.

What is claimed is:

1. A memory controller for a memory subsystem of a computer system, the memory controller for processing references to the memory subsystem and for directing those references to any memory devices of the memory subsystem, the memory controller for connection to a predetermined maximum number of memory devices of the memory subsystem and where each memory device is capable of maintaining a maximum number of simultaneously open pages, the memory controller comprising:

a first interface to a processor bus;

an address mapper coupled to the first interface and to a page tracking buffer;

a state machine for controlling the memory controller; and an interface to memory devices, coupled to the address mapper;

wherein the page tracking buffer further comprises a row address content addressable memory for determining when a reference is in a n open page, and a bank content addressable memory for determining when a reference is to the same bank as an open page;

wherein upon a reference to a page in the same bank as an open page the memory controller closes that open page prior to opening the page associated with the reference;

wherein the page tracking buffer has a plurality of lines in its row address content addressable memory and in its bank content addressable memory, each line corresponding to at most one open page, the number of lines is less than the product of the maximum number of memory devices times the maximum number of simultaneously open pages of each device; and wherein the page tracking buffer provides for tracking any open page of any of the memory devices while tracking a maximum number of open pages equal to the number of lines of its row address content addressable memory.

2. The memory controller of claim 1, wherein the page tracking buffer further comprises a conflict content addressable memory for determining when a reference is to a bank conflicting with a bank associated with the reference.

3. The memory controller of claim 2, wherein the address mapper maps the addresses of pages into banks such that pairs of sequential memory addresses crossing page boundaries are not mapped into conflicting pages.

4. The memory controller of claim 3, wherein the memory controller further comprises an incrementer and a decrementer coupled to receive a number of a referenced bank, and when a page is opened the conflict content addressable memory is written with an output of the incrementer and an output of the decrementer.

5. The memory controller of claim 1, wherein the page tracking buffer further comprises an incrementer and a decrementer coupled to receive a number of a referenced bank and wherein the bank content addressable memory is coupled to test for a match against outputs of the incrementer and decrementer as well as to the number of the referenced bank; the bank content addressable memory thereby determining when a reference is to a bank conflicting with a bank associated with the reference.

6. A method for controlling access to pages of memory system supporting multiple simultaneously-open pages, where an open page must be closed prior to accessing another page of the same or an adjacent bank, the method comprising:

providing a content addressable memory, said content addressable memory comprising a plurality of memory lines, each memory line corresponding to at most one open page, the number of memory lines being less than the product of the maximum number of memory devices in said memory system times the maximum number of simultaneously open pages of each memory device in said memory system;

comparing a bank number, a device number, and a page number of an desired page with a page number and bank number in said content addressable memory and, if both match, permitting access to the desired page;

if the bank number and the device number match, but the page number does not match, closing the open page and opening the desired page, recording the desired page number in a content addressable memory line associated with the bank, opening the desired page, and permitting access to the desired page;

if the bank number and page number of the desired page do not match, finding any adjacent bank having an open page, and if such an adjacent bank is found closing those open pages, recording the desired page and bank numbers in the content addressable memory line associated with one page just closed, opening the desired page, and permitting access to the desired page;

if the bank number did not match, and no adjacent bank having an open page is found, and the content addressable memory is full, evicting a line of the content addressable memory and closing any associated page; and if the bank number did not match, and no adjacent bank having an open page is found, allocating a line of the content addressable memory to the desired page, recording the desired page and bank numbers in the line of the content addressable memory; opening the desired page, and permitting access to the desired page.

7. The method of claim 6, wherein the step of finding any adjacent bank having an open page is performed by comparing a bank number of the desired page with a field in the content addressable memory that contains one plus a bank number of an open page, and a field in the content addressable memory that contains a bank number of an open page minus one.

8. The method of claim 6, wherein the step of finding any adjacent bank having an open page is performed by passing the bank number of the desired page through an incrementer and through a decrementer, and comparing outputs of the incrementer and the decrementer to information in the content addressable memory.

\* \* \* \* \*